US011734117B2

(12) United States Patent
Vaknin et al.

(10) Patent No.: US 11,734,117 B2
(45) Date of Patent: Aug. 22, 2023

(54) DATA RECOVERY IN A STORAGE SYSTEM (71) Applicant: VAST DATA LTD., Tel Aviv (IL)

(72) Inventors: Yogev Vaknin, Tel Aviv (IL); Lior Klipper, Tel Aviv (IL); Alon Berger, Tel Aviv (IL)

(73) Assignee: VAST DATA LTD., Tel Aviv (IL)

( * ) Notice: Subject to any disclaimer, the term of this patent is extended or adjusted under 35 U.S.C. 154(b) by 0 days.

(21) Appl. No.: 17/302,318

(22) Filed: Apr. 29, 2021

(65) Prior Publication Data
US 2022/0358017 A1 Nov. 10, 2022

(51) Int. Cl.
*G06F 11/00* (2006.01)
*G06F 11/14* (2006.01)
*G06F 11/10* (2006.01)

(52) U.S. Cl.
CPC ...... *G06F 11/1435* (2013.01); *G06F 11/1096* (2013.01); *G06F 2201/805* (2013.01)

(58) Field of Classification Search
CPC ............ G06F 11/1435; G06F 11/1076; G06F 11/1092; G06F 2201/805; G06F 2211/1057; G06F 11/1096
See application file for complete search history.

(56) References Cited

U.S. PATENT DOCUMENTS

| 5,623,595 A * | 4/1997 | Bailey ................. G06F 11/1076 348/E7.073 |
| 9,183,085 B1 * | 11/2015 | Northcott ............ G06F 11/1012 |
| 10,691,354 B1 * | 6/2020 | Kucherov ............. G06F 3/0613 |
| 10,733,061 B2 * | 8/2020 | Xu ......................... G06F 21/602 |
| 10,990,480 B1 * | 4/2021 | Bernat .................. G06F 3/0689 |
| 11,055,171 B2 * | 7/2021 | Ravindran .......... G06F 11/1004 |
| 11,074,146 B2 * | 7/2021 | Liu ....................... G06F 11/3452 |
| 2003/0196023 A1 * | 10/2003 | Dickson .............. G06F 11/1088 714/E11.034 |
| 2004/0250161 A1 * | 12/2004 | Patterson ............ G06F 11/1092 714/6.22 |
| 2005/0283654 A1 * | 12/2005 | Wood ................... G06F 11/1084 714/6.32 |
| 2006/0047993 A1 * | 3/2006 | Benhase ............. G06F 11/1076 714/2 |

(Continued)

*Primary Examiner* — Loan L. T. Truong
(74) *Attorney, Agent, or Firm* — Reches Patents

(57) ABSTRACT

A method for recovering failed chunks, the method may include (i) obtaining a failure indication about a failure of a first number (X1) of failed chunks; wherein the chunks were stored in a group of disks, the group of disks is configured to store a second number ($\alpha$) stripes of multiple (N) chunks, wherein each stripe comprises a first plurality (K) of data chunks and a second plurality (R) of parity chunks; wherein R exceeds $$\left(\frac{X1}{\alpha}\right);$$

and (ii) performing at least one recovery iteration until fulfilling a stop condition. Each recovery iteration of the at least one recovery iteration may include (a.i) selecting valid chunks to provide selected valid chunks, wherein a number of selected chunks is smaller than a product of a multiplication of R by $\alpha$; (a.ii) retrieving valid data chunks that are relevant to the selected valid chunks; and (a.iii) attempting to reconstruct the failed chunks based on the retrieved chunks.

31 Claims, 5 Drawing Sheets

(56) References Cited

U.S. PATENT DOCUMENTS

| | | | | |
|---|---|---|---|---|
| 2006/0242540 | A1* | 10/2006 | Cherian | G06F 11/1076 714/766 |
| 2007/0143359 | A1* | 6/2007 | Uppala | G06F 11/1004 |
| 2008/0126840 | A1* | 5/2008 | Chen | G06F 11/1084 714/5.1 |
| 2008/0222481 | A1* | 9/2008 | Huang | H03M 13/2909 714/752 |
| 2009/0055681 | A1* | 2/2009 | Dholakia | G06F 11/1076 714/6.13 |
| 2013/0073900 | A1* | 3/2013 | Li | G06F 11/1092 714/6.22 |
| 2014/0215147 | A1* | 7/2014 | Pan | G06F 11/1092 711/114 |
| 2015/0227422 | A1* | 8/2015 | Yochai | G06F 11/1096 714/764 |
| 2015/0355971 | A1* | 12/2015 | Becker-Szendy | G06F 11/1096 714/6.24 |
| 2016/0191080 | A1* | 6/2016 | Tonomura | H03M 13/1108 714/794 |
| 2016/0239397 | A1* | 8/2016 | Thomas | G06F 3/0689 |
| 2016/0350188 | A1* | 12/2016 | Song | G06F 3/0619 |
| 2017/0091018 | A1* | 3/2017 | Shu | G06F 11/0793 |
| 2017/0155709 | A1* | 6/2017 | Badanahatti | G06F 3/0617 |
| 2017/0270018 | A1* | 9/2017 | Xiao | G06F 3/0617 |
| 2017/0329674 | A1* | 11/2017 | Sreedhar M | G06F 12/128 |
| 2019/0129795 | A1* | 5/2019 | Xu | G06F 11/2094 |
| 2019/0158120 | A1* | 5/2019 | Andersson | H04L 1/0041 |
| 2019/0317889 | A1* | 10/2019 | Chang | G06F 3/064 |
| 2019/0391889 | A1* | 12/2019 | Luo | G06F 11/2094 |
| 2020/0264953 | A1* | 8/2020 | Qin | G06F 11/1076 |
| 2020/0310914 | A1* | 10/2020 | Shatsky | G06F 11/1088 |
| 2021/0157695 | A1* | 5/2021 | Tal | G06F 11/2094 |
| 2021/0208782 | A1* | 7/2021 | Zhu | G06F 3/0608 |

* cited by examiner

| 63(1) | 63(2) | 63(3) | 63(4) | 63(5) | 63(6) |
|---|---|---|---|---|---|
| DC(1,1) | DC(1,2) | DC(1,3) | DC(1,4) | PC(1,1) =PF1(DC(1,1),DC(1,2),DC(1,3),DC(1,4)) | PC(1,2)=PF2((DC(1,1),DC(1,2),DC(1,3),DC(1,4), DC(4,1), DC(2,3)) |
| DC(2,1) | DC(2,2) | DC(2,3) | DC(2,4) | PC(2,1) =PF1(DC(2,1),DC(2,2),DC(2,3),DC(2,4)) | PC(2,2)=PF2(DC(2,1),DC(2,2),DC(2,3),DC(2,4))XOR DC(3,1) XOR DC(1,4) |
| DC(3,1) | DC(3,2) | DC(3,3) | DC(3,4) | PC(3,1) =PF1(DC(3,1),DC(3,2),DC(3,3),DC(3,4)) | PC(3,2)=PF2(DC(3,1),DC(3,2),DC(3,3),DC(3,4), DC(1,2), DC(4,3)) |
| DC(4,1) | DC(4,2) | DC(4,3) | DC(4,4) | PC(4,1) =PF1(DC(4,1),DC(4,2),DC(4,3),DC(4,4)) | PC(4,2)=PF2(DC(4,1),DC(4,2),DC(4,3),DC(4,4), DC(2,2), DC(3,4)) |

DATA RECOVERY IN A STORAGE SYSTEM

TECHNICAL FIELD

The present disclosure generally relates to the field of data storage, and more particularly to data recovery in storage systems.

BACKGROUND

Storage systems may include multiple disks. A storage system may include multiple compute nodes and multiple storage nodes. Non-limiting examples of compute nodes and storage nodes are illustrated in US patent application 2019/0141128 which is incorporated herein by reference.

Recovery from disk failures has become a critical mission of massive scale storage systems with multitude storage devices, where the storage system is expected to tolerate multiple concurrent disk failures to avoid data loss.

Erasure code is an error correction scheme used for protecting data against multiple failures in RAID disk arrays, where the data is usually arranged as stripes having k symbols. When implemented in a storage system each stripe is composed of k data chunks, r redundant chunks (parity chunks), and a total of n chunks from n different storage devices, where n=k+r. The number of parity chunks dictates the number of concurrent disk failures that can be handled by the storage system without any data loss.

The parity chunks are calculated by applying parity calculation functions, such as summation, XOR, with or without coefficients.

Erasure codes allow to reconstruct a predefined number of failed chunks of stripes based on (other) valid chunks of the stripes. More parity chunks enable to reconstruct more failed chunks but require more storage space. The parity information produces storage overhead that can be represented by the ratio between the consumed physical storage space and the actual size of the user data stored, i.e., n/k.

When chunks from multiple failed disks needs to be recovered, a group of stripes that forms a matrix (referred to as parity check matrix), is used for solving a system of linear equations. In this case, the matrix inverse method is used to solve the linear equations for recovering the failed chunks.

Larger sized stripes that include a larger number of chunks from different disks is advantageous for reducing the amount of overhead imposed by the parity chunks. However, the larger size of stripes requires a larger matrix needed for solving the system of linear equations, and a resource consuming inversion of the large matrix.

The vast number of chunks and the very large parity check matrix cause the reconstruction process to be very lengthy, require significant computational resources and also require retrieving all the valid chunks.

There is a growing need to provide an efficient method for recovering failed chunks.

SUMMARY

There may be provide a storage system, a method and a non-transitory computer readable medium for chunk recovery.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a device or system capable of executing the method and/or to a non-transitory computer readable medium that stores instructions for executing the method.

Any reference in the specification to a system or device should be applied mutatis mutandis to a method that may be executed by the system, and/or may be applied mutatis mutandis to non-transitory computer readable medium that stores instructions executable by the system.

Any reference in the specification to a non-transitory computer readable medium should be applied mutatis mutandis to a device or system capable of executing instructions stored in the non-transitory computer readable medium and/or may be applied mutatis mutandis to a method for executing the instructions.

Any combination of any module or unit listed in any of the figures, any part of the specification and/or any claims may be provided.

The specification and/or drawings may refer to a compute core. The compute core can be a processing circuitry, a part of processing circuitry, a virtual machine core, and the like. The processing circuitry may be implemented as a central processing unit (CPU), a graphic processing circuitry (GPU), and/or one or more other integrated circuits such as application-specific integrated circuits (ASICs), field programmable gate arrays (FPGAs), full-custom integrated circuits, etc., or a combination of such integrated circuits.

Any combination of any steps of any method illustrated in the specification and/or drawings may be provided.

Any combination of any subject matter of any of claims may be provided.

Any combinations of systems, units, components, processors, sensors, illustrated in the specification and/or drawings may be provided.

Embodiments of the present invention utilizes a parity check matrix having one or more parity chunks in each row, where parity chunks that belong to a certain row sum the chunks from the same certain row, as well as some chunks from other rows. Each equation used for solving missing chunks associated with at least one row involves chunks from the same row, as well as some chunks from other rows.

According to embodiment of the invention, upon reconstructing failed disks or failed chunks, instead of reading all the valid chunks of the parity check matrix and resolving all the equations associated with the parity check matrix, an iterative process for solving equations is executed, where each iteration attempts to solve a subset of the equations and rebuilding a subset of the failed chunks.

Upon a first iteration, a subset of chunks is selected. The selected subset of chunks may belong to a selected subset of rows or a selected subset of equations. A selected subset of equations may be dictated by the function that constructed the parity chunks. The selected subset may include, for example, selected rows, e.g., rows 1-4, out of a total number of rows, and may further include extra chunks that are dictated by the formulas that constructed these rows' parities. For example, suppose the parity of row number 1 is a summation function of the chunks in the row, in addition to chunks in row 5 and 7, e.g., chunk(5,9) and chunk(7,2), then these extra chunk are selected as well. Only valid chunks, that are not failed chunks, are selected.

If the number of failed chunks involved in equations associated with the selected chunks is larger than the number of equations associated with the subset—then an additional number of chunks are added to the subset. For example, additional chunks can be added by adding one or more rows of chunks and the associated extra chunks as dictated by the row's parity chunks.

When the number of failed chunks can be resolved by the subset—the resolving of the sub-matrix is executed. After the resolving of the subset, the process is repeated with a new selected subset.

Figure 1:
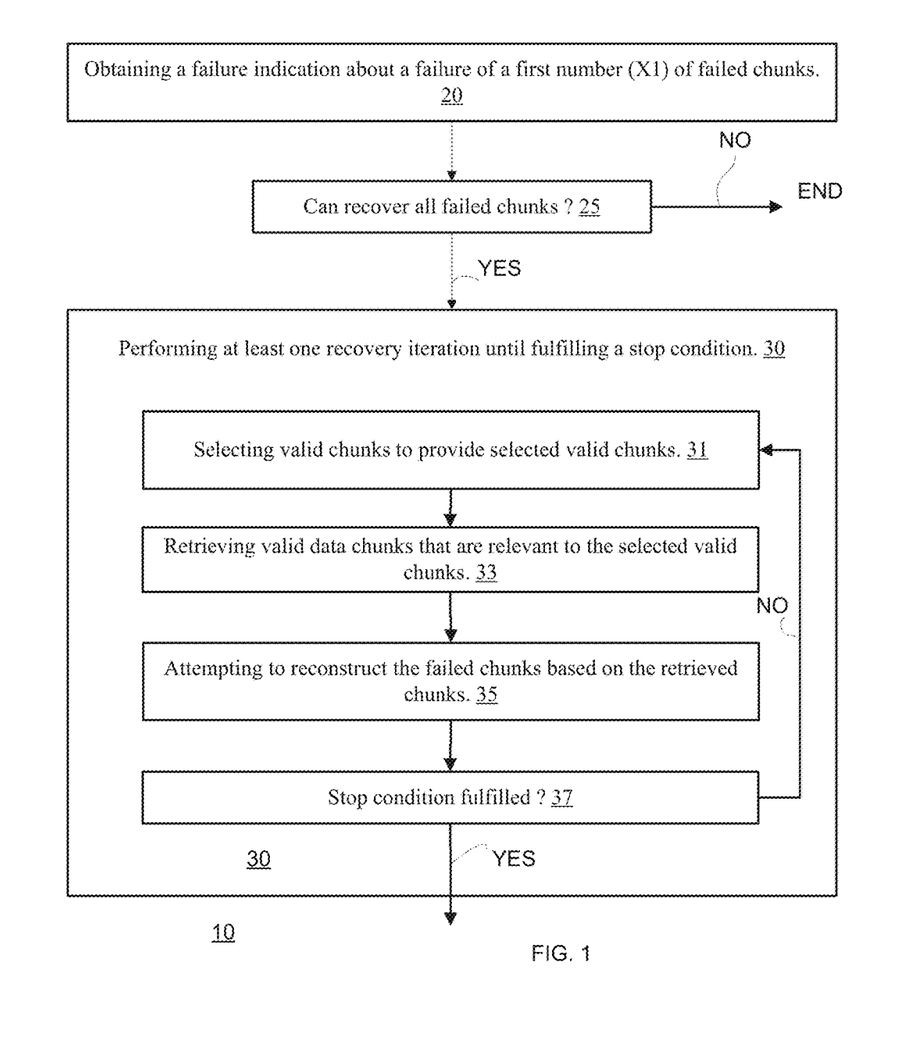
FIG. 1 illustrates an example of a method.

The current method is much simpler than the complexity of a partition of a very large parity check matrix of rows of the parity check matrix into subsets, where every subset contains only a disjoint sets of variables that can be solved independently FIG. 1 illustrates a method 10.

Method 10 may start by step 20 of obtaining a failure indication about a failure of a first number (X1) of failed chunks.

Step 20 may include receiving the failure indication, generating the failure indication, and the like. For example—step 20 may include monitoring the disks, monitoring messages exchanged between monitors that monitor the disks, and the like.

For simplicity of explanation, it is assumed that the failed chunks were stored (prior to the failure) at disks that failed and that were allocated for storing data chunks and not for storing parity chunks. This is only an example—disks may be allocated for storing parity chunks and data chunks, and/or failed disks may be allocated to store parity chunks.

Before the failure—multiple chunks (including the X1 chunks that are about to fail and additional chunks) were stored in a group of disks. The disks may store chunks of multiple users.

The group of disks may be configured to store a second number ($\alpha$) stripes—each stripe has multiple (N) chunks—to provide a total of N*$\alpha$ chunks. A stripe may form a row in the parity check matrix.

Each stripe includes a first plurality (K) of data chunks and a second plurality (R) of parity chunks. Thus—there are overall (K*$\alpha$) data chunks and (R*$\alpha$) parity chunks. Data chunks refer to data written by users of the storage system, i.e., chunks that are not produced by the system for redundancy purposes. A parity chunk is produced by a summation function that sums the data chunks of the stripe, as well as one or more extra data chunks from one or more other stripes.

It may also be assumed that there are a plurality (N1) of failed disks—and that $$N1 = \left(\frac{X1}{\alpha}\right).$$

The (R*$\alpha$) parity chunks enables recovery from a failure of up to (K*$\alpha$) chunks. Under the assumption mentioned above—the maximal number of failed disks that can be recovered is R, as the number of parity chunks in a stripe.

Thus—when the R is smaller than $$\left(\frac{X1}{\alpha}\right)$$

then recovery of all failed chunks is not feasible. Method 10 may include checking whether the failed chunks may be recovered—and if not—avoiding from performing step 30. This is illustrated by step 25.

Method 10 is highly effective when the number of failed disks is below (R)—as method 10 attempts to reconstruct failed chunks in an iterative manner—without initially solving all the parity functions associated with the X1 chunks.

Step 20 may be followed by step 30 of performing at least one recovery iteration until fulfilling a stop condition.

The iterations may stop when all failed data chunks are recovered or when a predefined number of iterations was reached and the method still failed to recover all failed chunks.

Each recovery iteration may include:

a. Selecting (31) valid chunks to provide selected valid chunks, wherein a number of selected chunks is smaller than (X1/$\alpha$). The selecting may include selecting a number of stripes (or rows) that involves failed chunks, wherein the selected valid chunks are valid (non-failed or corrupted) chunks that belong to the selected stripes. Alternatively, the selecting may include selecting parity chunks. The selecting may include selecting an initial subset of stripes and selected valid chunks included in the stripes or an initial subset of parity chunks. The selecting may also include adding selected valid chunks to the already selected subset of valid chunks, in a case where it is determined that the selected valid chunks and the valid data chunks are not sufficient for reconstructing associated failed chunks, which may happen when there are more missing (failed) chunks than the number of equations associated with the selected parities or stripes. The selecting may further include, after successfully reconstructing failed chunks, selecting a new subset of selected valid chunks, and repeating the process for resolving the new subset of chunks.

b. Retrieving (33) valid data chunks that are relevant to the selected valid chunks. Step 33 may include or may be preceded by determining which are the relevant valid chunks. The relevant valid data chunks may be data chunks that are included in summation functions that were used for creating the selected valid parity chunks. In case where the selected valid chunks are chunks included in a subset of stripes, the relevant valid chunks may be extra data chunks that are not part of the stripe but participate in the summation functions of the parities of the selected stripes.

c. Attempting (35) to reconstruct the failed chunks based on the retrieved chunks. This may include applying the erasure codes on the retrieved chunks. The attempting may include determining whether failed chunks associated with the relevant valid chunks can be reconstructed with the aid of the relevant valid chunks. The attempting can include determining that these failed chunks cannot be reconstructed based on a number of the failed chunks, or based on a relationship between the number of failed chunks and the number of relevant valid chunks. For example, if there are more failed chunks than the number of equations dictated by the parity chunks involved in the relevant chunks, then the equations cannot be resolved and the failed chunks cannot be reconstructed. The attempting may include reconstructing the failed chunks.

Each iteration may include or may be followed by checking if the stop condition (step 37) was fulfilled. If yes—the iteration stops and if no—jumping to the next iteration.

Regarding step 31— a. The selection may include selecting valid chunks that were not selected in any previous iteration.

b. The number of selected chunks may differ from at least one iteration to another iteration. For example—the first iteration may select more selected chunks than the second iteration.

c. Assuming that the failed chunks are data chunks then the first iteration may include selecting parity chunks of up to R stripes or up to (R*R) parity chunks—whereas the chunks may be arranged in more than R stripes.

d. The selection can be made in arbitrary manner, according to the order of rows—following a predefined scan pattern.

e. The selection can be made based on a relationship between failed chunks, parity functions and data chunks that were involved in a calculation of the parity chunks. For example—in case where the failed chunks are data chunk attempting to select the most relevant parity function—those who include the failed chunks. Such a selection may be less preferred when the number of failed chunks and/or the complexity of the parity function is high.

Regarding step 33—a relevant chunk may be determined based on the identity of the selected chunk.

a. For example—when the selected chunk is a parity chunk that is calculated by applying a parity function on some valid data chunks—then the parity chunk itself and these some valid data chunks are the relevant chunks. This selection can be made, for example when the failed chunks are data chunks.

b. Yet for another example—when the selected chunk is a data chunk, then the data chunk is the relevant chunk. This selection can be made, for example when the failed chunks are parity chunks.

Step 33 may include retrieving, during each recovery iteration, only (or mostly) the relevant data chunks. This reduces the I/O burden.

Figure 2A:
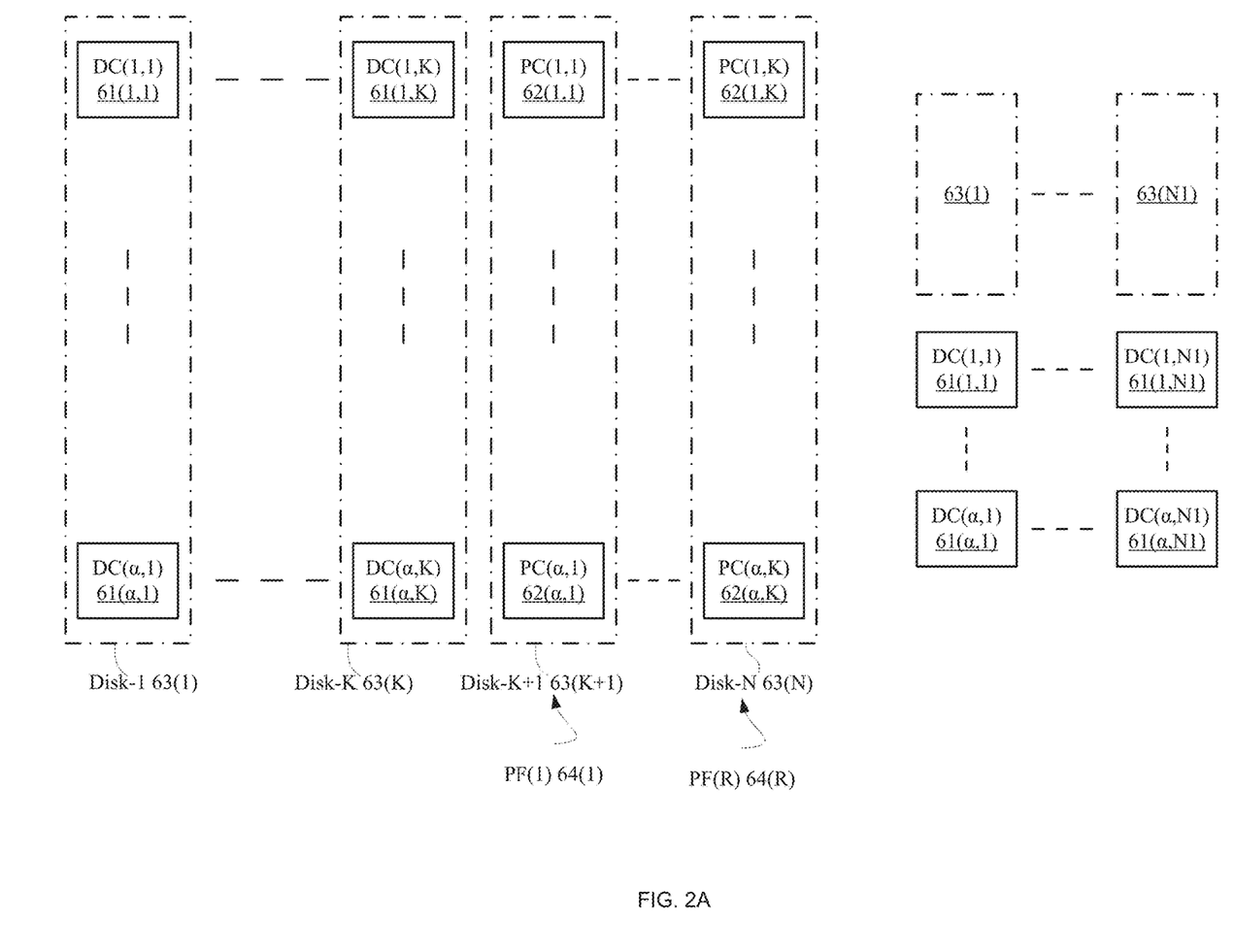
FIG. 2A illustrates an example of disks and chunks.

FIG. 2A illustrates an example of disks, data chunks, parity chunks, failed disks and failed parity chunks.

There are N disks, each disk stores a chunks. The first disk (disk-1 63(1)) till the K'th disk (disk-K 63(K)) are allocated for storing a data chunks each, and the (K+1)'th disk (disk-K+1 63(K+1)) till the N'th disk (disk-N 63(N)) are allocated for storing a parity chunks each. The (K+1)'th disk till the N'th disk includes R disks—whereas different disks may store parity chunks calculated by different parity functions.

There are $K*\alpha$ data chunks denoted $DC(1,1)-DC(\alpha,K)$ 61(1,1)-61($\alpha$,K), whereas the second index is indicative of the disk and the first index is indicative of an order within the disk. For example—the first disk stores data chunks $DC(1,1)-DC(\alpha,1)$ 61(1,1)-61($\alpha$,1). The K'th disk stores data chunks $DC(1,K)-DC(\alpha,K)$ 61(1,K)-61($\alpha$,K).

It is assumed that there are N1 failed disks and that these failed disks are the first till N1'th disk (N1 is lower than K) and that the failed chunks include X1 failed chunks, whereas $X1=N1*\alpha$. The failed chunks include data chunks $DC(1,1)-DC(\alpha,N1)$ 61(1,1)-61($\alpha$,N1). For example—the N1'th disk stores data chunks $DC(1,N1)-DC(\alpha,N1)$ 61(1,N1)-61($\alpha$,N1).

There are R parity function PF(1)-PF(r) 64(1)-64(R)-one per any of the disks allocated for storing data chunks.

Though FIG. 2A illustrates disks that stores data chunks only while other disks stores parity chunks only, any disk may store both data chunks and parity chunks. Although in this example, the failed chunks are resulted by failed disks, the failed chunks may be included in a partially failed disk or due to a local failure in a disk (e.g., a disk with failed blocks), and the number of failed chunks can be smaller than $N1*\alpha$.

The recovery of the failed data chunks is executed in an iterative manner.

For example—assuming an iterative process that first selects (during the first recovery iteration) the parity chunks of the first R rows-PC(1,1)-PC(R,R)—then the first iteration will include retrieving these parity chunks and the valid data chunks that were required for calculating these parity chunks.

If the iteration did not succeed to recover all failed data chunks—then another iteration is executed. The other iteration may include adding parity chunks of one or more rows in addition to parities PC(1,1)-PC(R,R), for example, adding parities of row R+1. If the iteration succeeds to recover the failed data chunks involved in the iteration, but not all the failed chunks have been recovered, then the next iteration will select other non-selected rows (e.g., rows R+2 to R+2+R) with other parity chunks.

Figure 2B:
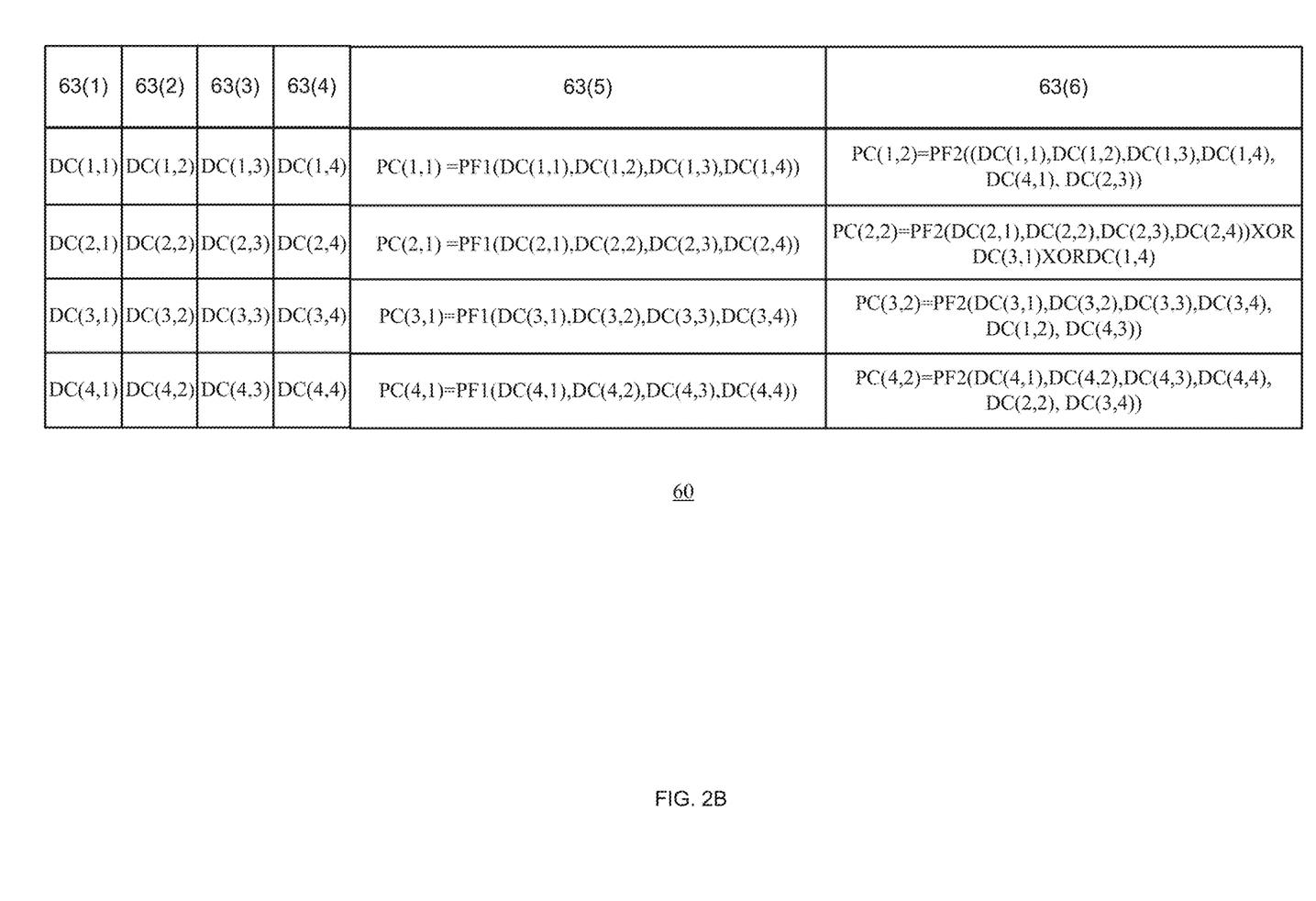
FIG. 2B illustrates an example of data and parity chunks.

FIG. 2B illustrates a table 60 that illustrates a case in which $\alpha=K=4$, R=2 and N=6. It shows six disks 63(1)-63(6) that store data chunks DC(1,1)-DC(4,4) and parity chunks PC(1,1)-PC(4,2) and per each parity chunk—it shown the parity function (PF1 or PF2) and the relevant data chunks per parity chunk.

A recovery process includes selecting up to four ($R^2$) parity chunks—for example up to the parity chunks of the first two rows.

Figure 3A:
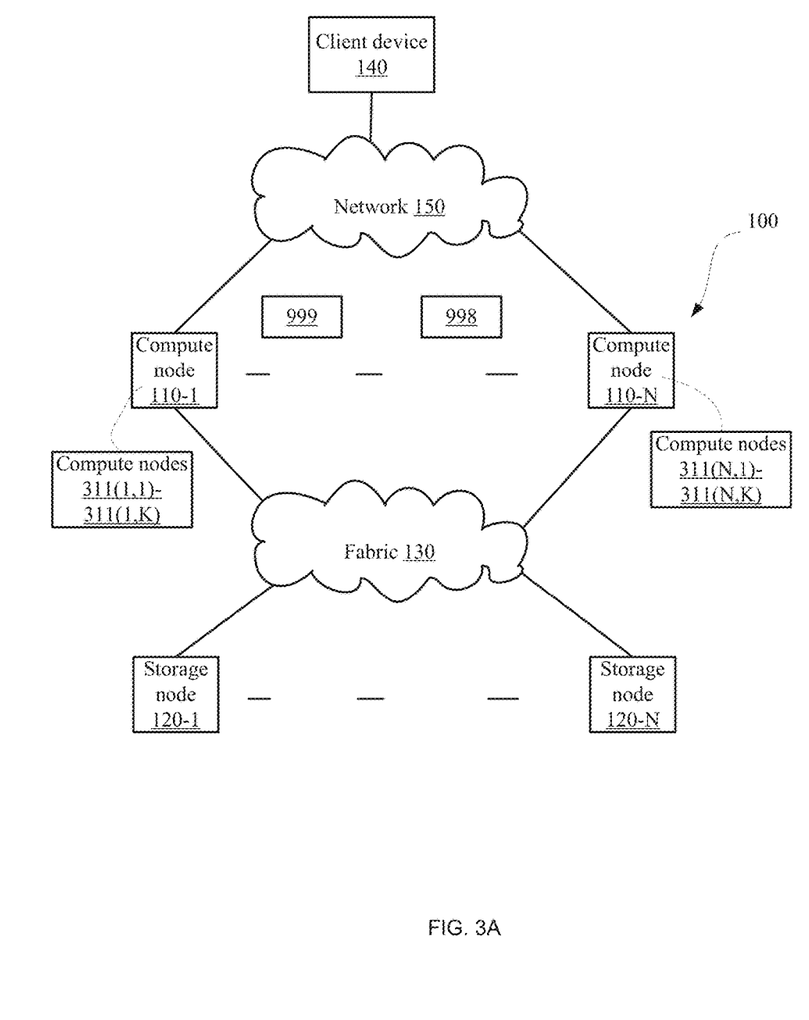
FIG. 3A is an example of a storage system.

FIG. 3A shows an example diagram of a storage system 100 according to the disclosed embodiments.

The storage system 100 includes a number of N compute nodes 110-1 through 110-N (hereinafter referred to individually as a compute node 110 and collectively as compute nodes 110, merely for simplicity purposes, N is an integer equal to or greater than 1). The compute nodes include (or may execute) multiple compute cores each—see for example compute nodes 311(1,1)-311(1,K) and compute nodes 311(N,1)-311(N,K).

The storage system 100 also includes a number of M storage nodes storage node 120-1 through 120-M (hereinafter referred to individually as a storage node 120 and collectively as storage nodes 120, merely for simplicity purposes, M is an integer equal to or greater than 1). The computer nodes 110 and the storage nodes 120 are connected through a communication fabric 130. M may equal N or may differ from N.

In an embodiment, a compute node 110 may be realized as a physical machine or a virtual machine. A physical machine may include a computer, a sever, and the like. A virtual machine may include any virtualized computing instance (executed over a computing hardware), such as a virtual machine, a software container, and the like.

It should be noted that in both configurations (physical or virtual), the compute node 110 does not require any dedicated hardware. An example arrangement of a compute node 110 is provided in FIG. 3D.

A compute node 110 is configured to perform tasks related to the management of the storage nodes 120. In an embodiment, each compute node 110 interfaces with a client device 140 (or an application installed therein) via a network 150. To this end, a compute node 110 is configured to receive requests (e.g., read or write requests) and promptly serve these requests in a persistent manner. The network 150 may be, but is not limited to, the Internet, the world-wide-web (WWW), a local area network (LAN), a wide area network (WAN), and the like.

In an embodiment, a compute node 110 is configured to interface with different protocols implemented by the client devices or applications (e.g., TCP/IP, HTTP, FTP, etc.) and to manage the read and write operations to the storage nodes 120. The compute node 110 is further configured to translate the protocol commands into a unified structure (or language). Then, each compute node 110 is also configured to logically address and map all elements stored in the storage nodes 120.

Further, each compute node 110 may maintain the logical operations of elements and the relationships between the elements (for example, directory trees) and an element attribute (e.g., metadata) via state stored on the storage nodes 120. An element may include a file, a directory, an object, and the like. The mapping and addressing of the elements allow the compute node 110 to maintain the exact physical locations of the elements in the storage nodes 120.

In an embodiment, to efficiently read and write data to the storage nodes 120 from the physical layer, each compute node 110 performs a number of processes including data reduction, data resiliency, and Flash memory management actions (e.g., defrag, wear leveling, and so on).

It should be noted that each compute node 110 may operate in the same manner as all other compute nodes 110. In a case of a failure, any compute node 110 can replace the failed node. Further, each compute node may control and manage one or mode storage nodes 120 regardless of the specific architecture of the storage nodes 120. Therefore, there is no coupling between specific compute nodes 110 and specific storage nodes 120. As such, compute nodes can be added to the system 100 without increasing the number of storage nodes (or their capacity), and vice versa, storage nodes can be added without increasing the number of compute nodes 110.

The storage nodes 120 provide the storage and state in the system 100. To this end, each storage node 120 may include a plurality of SSDs which may be relatively inexpensive.

The storage nodes 120 may be configured to have the same capacity as each other or different capacities from each other. In an embodiment, the data stored in each storage node 120 is made redundant internally within the storage node, made redundant at a different storage node, or both. As will be discussed below with reference to FIGS. 3C and 3D, each storage node 120 further includes a non-volatile random-access memory (NVRAM) and an interface module for interfacing with the compute nodes 110.

A storage node 120 may be configured to communicate with the compute nodes 110 over the communication fabric 130. It should be noted that each compute node 110 can communicate with each storage node 120 over the communication fabric 130. There may not be a direct coupling between a compute node 110 and storage node 120.

In the embodiment, the communication fabric 130 may include an Ethernet fabric, an InfiniB and fabric, and the like. Specifically, the communication fabric 130 may enable communication protocols such as, but not limited to, remote direct memory access (RDMA) over Converged Ethernet (RoCE), iWARP, Non-Volatile Memory Express (NVMe), and the like. It should be noted that the communication protocols discussed herein are provided merely for example purposes, and that other communication protocols may be equally utilized in accordance with the embodiments disclosed herein without departing from the scope of the disclosure.

It should be noted that in one example deployment, the client device 140 is part of a computer node 110. In such a deployment, the system 100 does not communicate with an external network, e.g., the network 150. It should be further noted that the communication between the compute nodes 110 and the storage nodes 120 is always facilitated over the fabric 130. It should be further noted that the compute nodes 120 can communicate with each other over the fabric 130. The fabric 130 is a shared fabric.

FIG. 3A also illustrates a load monitor 998 and a load balancer 999. The load balancer 999 and the load monitor 998 may be included in one of the compute nodes, may be located outside any of the compute nodes, may be combined, may include one or more compute cores, may be executed by one or more compute cores, and the like. There may be more than a single load balancer and a single load monitor.

Figure 3B:
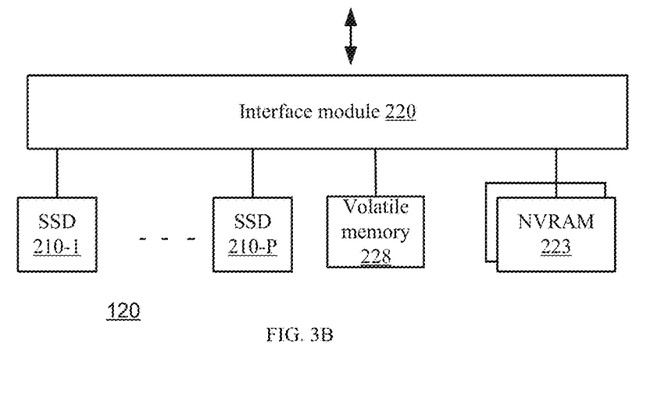
FIG. 3B is an example of a storage node.

FIG. 3B shows an example block diagram illustrating a storage node 120 according to an embodiment. The storage node 120 includes a plurality of storage devices such as SSDs 210-1 through 210-P (hereinafter referred to individually as an SSD 210 and collectively as SSDs 210, merely for simplicity purposes), at least one NVRAM, and an interface module 220.

According to the disclosed embodiments, the NVRAM 223 is utilized to reduce the number of write accesses to the SSDs 210 and the write amplification. According to an embodiment, data is written first to the NVRAM 223, which returns an acknowledgement after each such data write. Then, during a background process, the data is transferred from the NVRAM 223 to the SSDs 210. The data may kept in the NVRAM 223 until the data is completely written to the SSDs 210. Furthermore, this writing procedure ensures no data is lost when power is off.

As the NVRAM 223 supports low write latency and parallel writes, the storage node 120 supports these features. Specifically, the low latency is achieved by acknowledging the write request once the data is saved to the NVRAM 223. The parallel writes are achieved by serving multiple concurrent write requests by the NVRAM 223 and, during the background process, independently fulfilling such requests by saving the data into the SSDs 210.

Figure 3C:
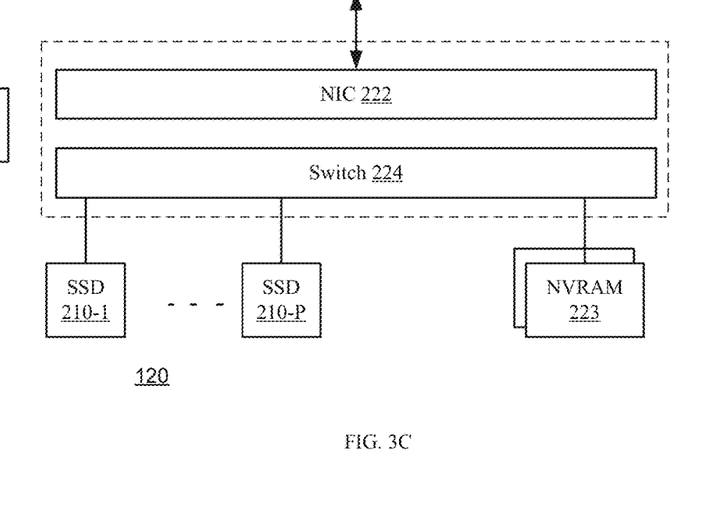
FIG. 3C is an example of an interface module of a storage node.

FIG. 3C shows an example block diagram of an interface module 220. In an example embodiment, an interface module 220 includes a network interface card (NIC) 222 and a switch 224 connected through an internal bus (not shown), e.g., a PCIe bus.

The NIC 222 allows the communication of the storage node 120 with the compute nodes (110, FIG. 3A) over the communication fabric (130, FIG. 3A). The NIC 222 may allow communication via at least one of the protocols discussed above.

The switch 224 allows the connection of the multiple SSDs 210 and NVRAM 223 to and NIC 222. In an example embodiment, the switch 224 is a PCIe switch.

In another embodiment, more than one PCIe switch is utilized to support more connectivity to the SSDs. In some configurations, where non PCIe SSDs 210 are available (e.g., Ethernet SSDs), the switch 224 may be a non PCIe switch, for example an Ethernet switch.

Figure 3D:
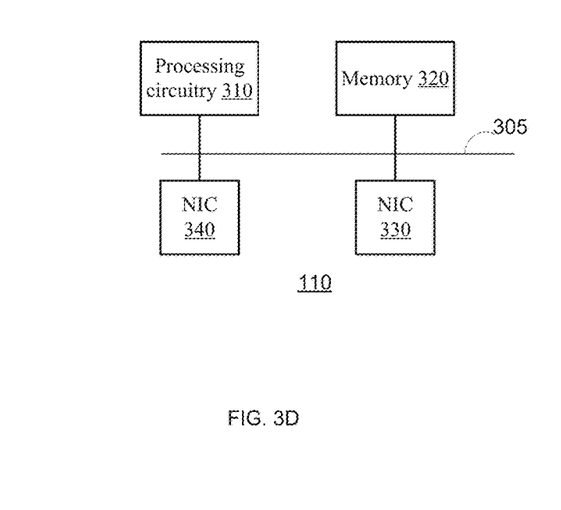
FIG. 3D is an example of a compute node.

FIG. 3D shows an example block diagram illustrating a compute node 110 according to an embodiment. The compute node 110 includes a processing circuitry 310, a memory 320, a first network interface controller (NIC) 330 and a second NIC 340. In an embodiment, the components of the compute node 110 may be communicatively connected via a bus 305.

The processing circuitry 310 may be realized as one or more hardware logic components and circuits. For example, and without limitation, illustrative types of hardware logic components that can be used include a field programmable gate array (FPGA), an Application Specific Integrated Circuit (ASIC), an Application Specific Standard Product (ASSP), a System On Chip (SOC), a general-purpose microprocessor, a microcontroller, a Digital Signal Processor (DSP), a neural network processor, and the like, or any other hardware logic components that can perform calculations or other manipulations of information.

The memory 320 may be volatile (e.g., RAM, etc.), non-volatile (e.g., ROM, flash memory, etc.), or a combination thereof. In one configuration, computer readable instructions or software to implement one or more processes performed by compute node 110 may be stored in the memory 320. Software shall be construed broadly to mean any type of instructions, whether referred to as software, firmware, middleware, microcode, hardware description language, or otherwise. Instructions may include code (e.g., in source code format, binary code format, executable code format, or any other suitable format of code).

The first NIC 330 allows the compute node 110 to communicate with the storage nodes via the communication fabric 130 (see FIG. 3A) to provide remote direct memory access to data stored in the storage nodes. In an embodiment, the first NIC 130 may enable communication via RDMA protocols such as, but not limited to, InfiniB and, RDMA over Converged Ethernet (RoCE), iWARP, and the like.

The second NIC 340 allows the compute node 110 to communicate with client devices (e.g., client device 140, FIG. 3A) through a communication network (e.g., the network 150, FIG. 3A). Examples for such a network includes, but is not limited to, the Internet, the world-wide-web (WWW), a local area network (LAN), a wide area network (WAN), and the like. It should be appreciated that in some configurations, the compute node 110 may include a single NIC. This configuration is applicable when, for example, the fabric is shared.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention as claimed.

In the foregoing specification, the invention has been described with reference to specific examples of embodiments of the invention. It will, however, be evident that various modifications and changes may be made therein without departing from the broader spirit and scope of the invention as set forth in the appended claims.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Any reference to "consisting", "having" and/or "including" should be applied mutatis mutandis to "consisting" and/or "consisting essentially of".

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

It is appreciated that various features of the embodiments of the disclosure which are, for clarity, described in the contexts of separate embodiments may also be provided in combination in a single embodiment. Conversely, various features of the embodiments of the disclosure which are, for brevity, described in the context of a single embodiment may also be provided separately or in any suitable sub-combination.

It will be appreciated by persons skilled in the art that the embodiments of the disclosure are not limited by what has been particularly shown and described hereinabove. Rather the scope of the embodiments of the disclosure is defined by the appended claims and equivalents thereof.

We claim:

1. A method for recovering failed chunks, the method comprises:
    obtaining a failure indication about a failure of a first number (X1) of failed chunks; wherein the failed chunks were stored in a group of disks, the group of disks is configured to store multiple ($\alpha$) stripes, each stripe comprises multiple (N) chunks that comprises a first plurality (K) of data chunks and a second plurality (R) of parity chunks; wherein at least one parity chunk that belongs to a certain stripe is calculated based on one or more data chunks that belong to other stripes; and
    performing at least one recovery iteration until fulfilling a stop condition; wherein each recovery iteration of the at least one recovery iteration comprises:
        selecting valid chunks to provide selected valid chunks, wherein a number of selected chunks is smaller than a product of a multiplication of R by $\alpha$, wherein the selecting includes arbitrarily selecting at least two stripes from the multiple stripes, wherein the at least two stripes are associated with a subset of equations, wherein the subset of equations includes a portion of multiple equations that need to be solved for recovering the first number of failed chunks, and wherein the selecting further includes selecting at least one extra data chunk that belongs to a non-selected stripe of the multiple stripes, in a case where the subset of equations dictates the at least one extra data chunk;
        when it is determined that a number of failed chunks related to the subset of equations exceeds a number of equations in the subset of equations:
            adding additional valid chunks to the selected valid chunks, wherein the adding includes arbitrarily selecting, from the multiple stripes, one or more additional stripes that were not previously selected, wherein the one or more additional stripes are associated with at least one additional equation that is added to the subset of equations;
            wherein the step of adding is repeated if it is determined that the number of failed chunks related to the subset of equations still exceeds the number of equations in the subset of equations;
        when it is determined that the number of failed chunks related to the subset of equations does not exceed the number of equations in the subset of equations:
            retrieving valid data chunks that are relevant to the selected valid chunks; and reconstructing the failed chunks related to the subset of equations based on the retrieved chunks and the subset of equations.

2. The method according to claim 1 wherein the stop condition is fulfilled when all of the failed chunks are recovered.

3. The method according to claim 1 wherein the stop condition is fulfilled when a predetermined number of recovery iterations failed to recover all the failed chunks.

4. The method according to claim 1 wherein a number of selected valid chunks differs between two recovery iterations.

5. The method according to claim 1 wherein when a selected valid chunk is a relevant valid chunk when the selected valid chunk is a data chunk; and
    wherein when a selected valid chunk is a parity chunk, then relevant valid chunks of the parity chunk comprise the parity chunk and all valid data chunk that participate in a calculation of the parity chunk.

6. The method according to claim 1 wherein the selecting of the valid chunks, during a first recovery iteration, comprises selecting parity chunks of up to R stripes and attempting to reconstruct failed chunks using the parity chunks of the up to R stripes; when the first recovery iteration fails to recover all failed chunks associated with the first iteration then executing one or more other iterations that comprises retrieving parity chunks of one or more stripes other than the R stripes and attempting to reconstruct any failed chunk that was associated with the first iteration that was not recovered in the first iteration.

7. The method according to claim 1 wherein the selecting of the valid chunks, during a first recovery iteration, comprises selecting up to R*R parity chunks.

8. The method according to claim 1 wherein the selecting is executed based on an order of the multiple stripes.

9. The method according to claim 1 wherein the selecting is based on a relationship between failed chunks, parity functions and data chunks that were involved in a calculation of the parity chunks.

10. The method according to claim 1 comprising retrieving, during each recovery iteration, only the relevant data chunks.

11. The method according to claim 1 wherein the at least one recovery iteration comprises multiple recovery iterations and wherein a recovery iteration comprises selecting valid chunks not selected in any previous recovery iteration.

12. The method according to claim 1 comprising determining to execute the at least one recovery iteration when evaluating that R exceeds $$\left(\frac{X1}{\alpha}\right).$$

13. A non-transitory computer readable medium for recovering failed chunks in a storage system in a storage system, the non-transitory computer readable medium stores instructions for:
obtaining a failure indication about a failure of a first number (X1) of failed chunks; wherein the failed chunks were stored in a group of disks, the group of disks is configured to store multiple ($\alpha$) stripes, each stripe comprises multiple (N) chunks that comprises a first plurality (K) of data chunks and a second plurality (R) of parity chunks; wherein at least one parity chunk that belongs to a certain stripe is calculated based on one or more data chunks that belong to other stripes; and
performing at least one recovery iteration until fulfilling a stop condition;
wherein each recovery iteration of the at least one recovery iteration comprises:
selecting valid chunks to provide selected valid chunks, wherein a number of selected chunks is smaller than a product of a multiplication of R by a, wherein the selecting includes arbitrarily selecting at least two stripes from the multiple stripes, wherein the at least two stripes are associated with a subset of equations, wherein the subset of equations includes a portion of multiple equations that need to be solved for recovering the first number of failed chunks, and wherein the selecting further includes selecting at least one extra data chunk that belongs to a non-selected stripe of the multiple stripes, in a case where the subset of equations dictates the at least one extra data chunk;
when it is determined that a number of failed chunks related to the subset of equations exceeds a number of equations in the subset of equations:
adding additional valid chunks to the selected valid chunks, wherein the adding includes arbitrarily selecting, from the multiple stripes, one or more additional stripes that were not previously selected, wherein the one or more additional stripes are associated with at least one additional equation that is added to the subset of equations;
wherein the step of adding is repeated if it is determined that the number of failed chunks related to the subset of equations still exceeds the number of equations in the subset of equations;
when it is determined that the number of failed chunks related to the subset of equations does not exceed the number of equations in the subset of equations:
retrieving valid data chunks that are relevant to the selected valid chunks; and
reconstructing the failed chunks related to the subset of equations based on the retrieved chunks and the subset of equations.

14. The non-transitory computer readable medium according to claim 13 wherein the stop condition is fulfilled when all of the failed chunks are recovered.

15. The non-transitory computer readable medium according to claim 13 wherein the stop condition is fulfilled when a predetermined number of recovery iterations failed to recover all the failed chunks.

16. The non-transitory computer readable medium according to claim 13 wherein a number of selected valid chunks differs between two recovery iterations.

17. The non-transitory computer readable medium according to claim 13 wherein when a selected valid chunk is a relevant valid chunk when the selected valid chunk is a data chunk; and
wherein when a selected valid chunk is a parity chunk, then relevant valid chunks of the parity chunk comprise the parity chunk and all valid data chunk that participate in a calculation of the parity chunk.

18. The non-transitory computer readable medium according to claim 13 wherein the selecting of the valid chunks, during a first recovery iteration, comprises selecting parity chunks of up to R stripes.

19. The non-transitory computer readable medium according to claim 13 wherein the selecting of the valid chunks, during a first recovery iteration, comprises selecting up to R*R parity chunks.

20. The non-transitory computer readable medium according to claim 13 wherein the selecting is executed based on an order of the multiple stripes.

21. The non-transitory computer readable medium according to claim 13 wherein the selecting is based on a relationship between failed chunks, parity functions and data chunks that were involved in a calculation of the parity chunks.

22. The non-transitory computer readable medium according to claim 13 that stores instructions for retrieving, during each recovery iteration, only the relevant data chunks.

23. The non-transitory computer readable medium according to claim 13 wherein the at least one recovery iteration comprises multiple recovery iterations and wherein a recovery iteration comprises selecting valid chunks not selected in any previous recovery iteration.

24. The non-transitory computer readable medium according to claim 13 that stores instructions for determining to execute the at least one recovery iteration when evaluating that R exceeds $$\left(\frac{X1}{\alpha}\right).$$

25. A storage system the comprises a controller, a memory unit and multiple disks; wherein the controller is configured to:
obtain a failure indication about a failure of a first number (X1) of failed chunks; wherein the failed chunks were stored in a group of disks, the group of disks is configured to store multiple ($\alpha$) stripes, each stripe comprises multiple (N) chunks that comprises a first plurality (K) of data chunks and a second plurality (R) of parity chunks; wherein at least one parity chunk that belongs to a certain stripe is calculated based on one or more data chunks that belong to other stripes; and
perform at least one recovery iteration until fulfilling a stop condition;

wherein each recovery iteration of the at least one recovery iteration comprises:

select valid chunks to provide selected valid chunks, wherein a number of selected chunks is smaller than a product of a multiplication of R by $\alpha$, wherein the selecting includes arbitrarily selecting at least two stripes from the multiple stripes, wherein the at least two stripes are associated with a subset of equations, wherein the subset of equations includes a portion of multiple equations that need to be solved for recovering the first number of failed chunks, and wherein the selecting further includes selecting at least one extra data chunk that belongs to a non-selected stripe of the multiple stripes, in a case where the subset of equations dictates the at least one extra data chunk;

when it is determined that a number of failed chunks related to the subset of equations exceeds a number of equations in the subset of equations:

add additional valid chunks to the selected valid chunks, wherein the adding includes arbitrarily selecting, from the multiple stripes, one or more additional stripes that were not previously selected, wherein the one or more additional stripes are associated with at least one additional equation that is added to the subset of equations; wherein the controller is configured to repeat adding additional valid chunks if it is determined that the number of failed chunks related to the subset of equations still exceeds the number of equations in the subset of equations;

when it is determined that the number of failed chunks related to the subset of equations does not exceed the number of equations in the subset of equations:

retrieve valid data chunks that are relevant to the selected valid chunks; and         reconstruct the failed chunks related to the subset of equations based on the retrieved chunks and the subset of equations.

26. The method according to claim 1 wherein the at least one iteration comprises a first iteration and a second iteration; wherein the first iteration comprises selecting parity chunks of first stripes, and attempting to reconstruct failed chunks associated with the first iteration using the first stripes.

27. The method according to claim 26 wherein when the first recovery iteration fails to recover all failed data chunks associated with the first iteration then the second iteration comprises retrieving parity chunks of one or more stripes of second stripes, and attempting to reconstruct any failed data chunk associated with the first iteration that was not recovered by the first iteration; wherein the second stripes comprises two or more stripes.

28. The method according to claim 27 wherein the first recovery iteration succeeded to recover all failed data chunks associated with the first iteration then the second iteration comprises retrieving parity chunks of one or more stripes of second stripes, and attempting to reconstruct failed data chunk not associated with the first iteration.

29. The non-transitory computer readable medium according to claim 13 wherein the at least one iteration comprises a first iteration and a second iteration; wherein the first iteration comprises selecting parity chunks of first stripes, and attempting to reconstruct failed chunks associated with the first iteration using the first stripes.

30. The non-transitory computer readable medium according to claim 29 wherein the first recovery iteration fails to recover all failed data chunks associated with the first iteration then the second iteration comprises retrieving parity chunks of one or more stripes of second stripes, and attempting to reconstruct any failed data chunk associated with the first iteration that was not recovered by the first iteration.

31. The non-transitory computer readable medium according to claim 30 wherein the first recovery iteration succeeded to recover all failed data chunks associated with the first iteration then the second iteration comprises retrieving parity chunks of one or more stripes of second stripes, and attempting to reconstruct failed data chunk not associated with the first iteration.

\* \* \* \* \*